March 12, 1940.　　　　J. SLEPIAN　　　　2,193,604
CURRENT CONVERSION SYSTEM
Filed April 14, 1938
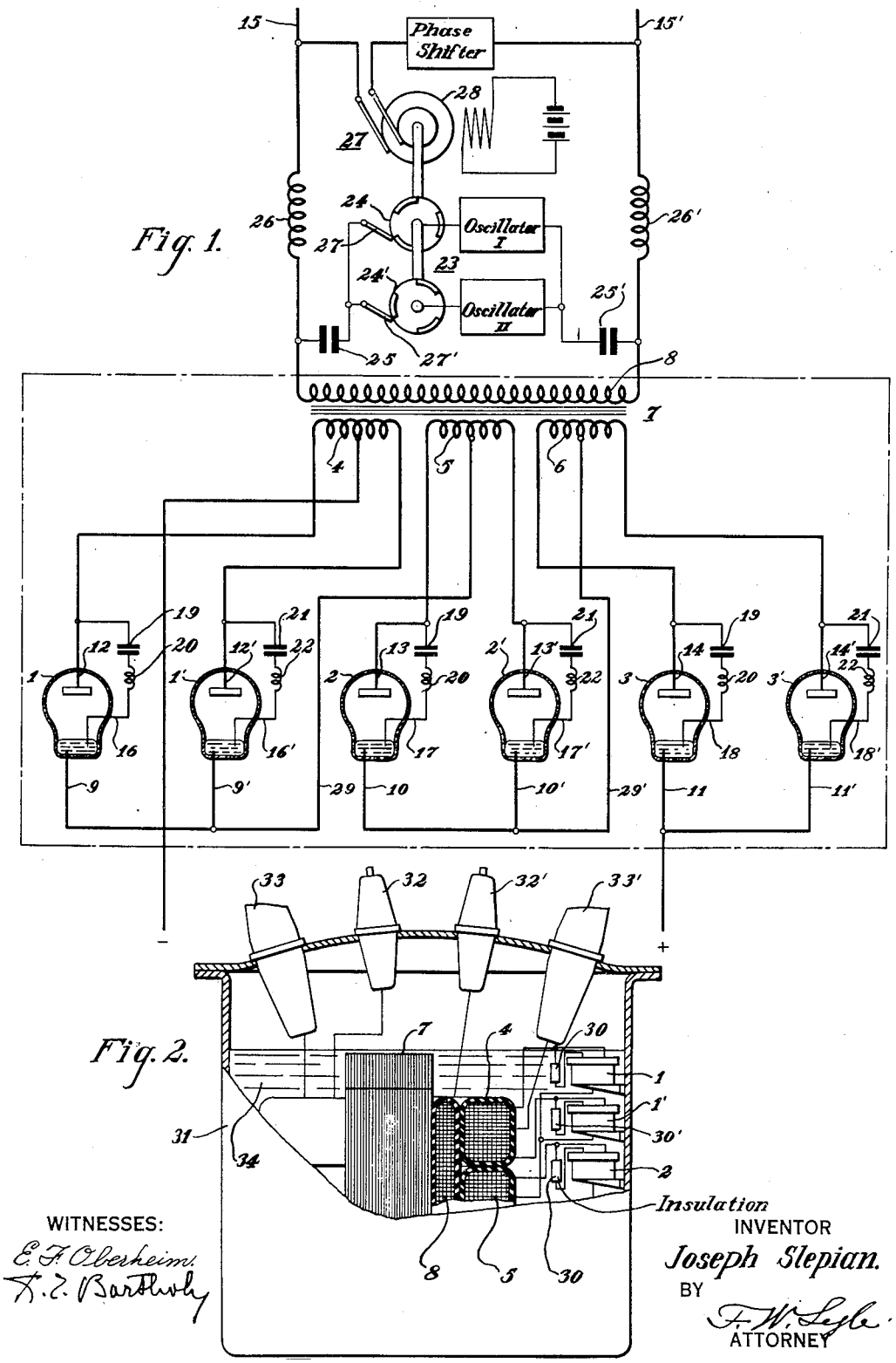
WITNESSES:
E. F. Oberheim
F. E. Bartholy
INVENTOR
Joseph Slepian.
BY
F. W. Lyle
ATTORNEY Patented Mar. 12, 1940

2,193,604

UNITED STATES PATENT OFFICE 2,193,604

CURRENT CONVERSION SYSTEM

Joseph Slepian, Pittsburgh, Pa., assignor to Westinghouse Electric & Manufacturing Company, East Pittsburgh, Pa., a corporation of Pennsylvania Application April 14, 1938, Serial No. 202,017

11 Claims. (Cl. 175—363)

This invention relates to systems of current conversion and more particularly to arrangements for transformation of alternating currents of relatively low voltage to direct current of high voltage and vice versa.

The primary object of this invention is to efficiently convert alternating current energy into direct current at high voltages by means of vapor arc discharge devices especially of the type known as ignitrons.

Another object of this invention is the provision of means whereby high voltage direct current suitable for power distribution purposes may be obtained by a simple unitary structure of ignitron rectifiers with minimum of circuit components and wiring necessary for such installations.

Certain advantages of high voltage direct current transmission are well known in the art and various attempts have been made to overcome the difficulties encountered in the realization thereof. In systems of the type wherein vapor arc power rectifiers are employed and their output voltages additively combined, the synchronous control of the rectifiers introduces a serious problem. Moreover, in a system of this type the insulation and spacing necessary for the conductors carrying high voltages when the rectifiers are arranged at a distance from the source of alternating current to be converted increases the cost of installation to such an extent as to offset the advantages inherent with direct current transmission. Among these advantages it may be mentioned that the effective direct current voltage may be 1.40 times the effective alternating current voltage for the same peak. The length of the transmission line is not limited by the stability of the system and cables may carry 2 to 4 times the voltage on direct current than on alternating current.

The constructional disadvantages and difficulties of a high voltage rectifier type converter have been eliminated by the circuit arrangement in accordance with this invention which permits the placing of all rectifiers in close proximity of the power transformer, thereby forming a unitary structure. Furthermore, in the synchronous control of the rectifiers the existing wirings conducting the power of the system may be utilized as conductors for the currents controlling the excitation of all rectifiers.

This is a salient point in the practical embodiment of this invention. The bank of rectifier tubes of the sealed-off metal type may be placed directly in close proximity of the transformer under the same protective casing and immersed in oil together with the transformer windings. In this manner, the leads connecting the various windings of the transformer with the electrodes of the tubes as well as the interconnecting wires between tube elements may be kept very short and under the insulation provided by the oil in the transformer. The entire structure forms then a compact unit housing all the necessary apparatus and only the input and output leads are brought out.

Other objects will become evident from the following description of the invention defined in particularity by the appended claims, taken in connection with the accompanying drawing wherein:

Figure 1 represents schematically the circuit arrangement of a current converter constructed in accordance with this invention, and Fig. 2 represents a side elevational view in partial cross-section of the practical embodiment thereof.

Referring to Fig. 1, a plurality of rectifiers 1, 1', 2, 2', 3 and 3' are arranged in groups of two, each group in a full wave circuit connected respectively to the secondary windings 4, 5 and 6 of the transformer 7. The latter, together with the rectifiers, is preferably arranged in a unitary structure indicated by the quadrangle in dotted lines whereby all connections from the transformer 7 to the anodes of the rectifiers may be as short as possible and only the two input wires to the primary winding 8 of the transformer 7 and the output wires for the high voltage direct current line need to be brought out from the structure. The rectifiers for this purpose are of the type described in U. S. Patent No. 2,069,283, issued February 2, 1937, known in the art as ignitrons. Following the circuit diagram, it will be seen that the first group of ignitrons have their cathodes 9 and 9' connected together and their anodes 12 and 12' connected to the terminals of the secondary winding 4, the center tap of which is brought out to form the negative terminal of the system. The junction point of the cathodes 9 and 9' in turn is connected to the center tap of the succeeding secondary winding 5, the terminals of which connect to the anodes 13 and 13' respectively of the second group of rectifiers 2 and 2'. The cathodes 10 and 10' thereof are connected together and the junction point of this connection continued to the center tap of the third secondary winding 6, the terminals of which connect to the anodes 14 and 14' of the third group of rectifiers 3 and 3', respectively. The cathodes 11 and 11' of this group are connected together and the junction point of this connection forms the terminal of the positive side of the direct current line. By connecting the cathodes of each pair of rectifiers effectively to the anodes of the succeeding pair, the output of each group of rectifiers operating in a full wave rectification circuit arrangement is additively combined and the voltage between the output terminals of the direct current line will be the sum of the voltages supplied by each pair of rectifiers. The primary winding 8 of the transformer 7 is the low voltage alternating current input side of the system connected to the alternating current power line represented by conductors 15 and 15'.

The control of the rectifiers to operate in synchronism with the alternating current input and simultaneously for each group of rectifiers is effected by high frequency control currents superimposed upon the alternating current power. Each ignition rectifier in the system has its make-alive electrode 16, 16', 17, 17', 18, 18' connected to its respective anode by means of a capacity and inductance in series. The series resonant circuit comprising this capacity and inductance is so chosen in value that in each pair of rectifiers one resonant circuit will be responsive to one frequency and the second resonant circuit to another frequency, the same characteristic condition being maintained in each pair of rectifiers. In other words, condenser 19 and inductance 20 associated with rectifier 1 has similar electrical characteristics with condensers 19 and 20 associated with rectifier 2 and rectifier 3, whereas condenser 21 and inductance 22 associated with rectifier 1' is similar in electrical characteristics to condenser 21 and inductance 22 associated with rectifiers 2' and 3'. In this manner, the make-alive electrode of one rectifier in each group will be responsive to a certain control frequency whereas the make-alive of the other rectifier of each group to another control frequency different from the first one mentioned. The two distinct control frequencies may be generated by suitable oscillators as indicated in the drawing by squares marked "oscillators" I and II. The control frequencies of the oscillators are alternately supplied to the line through a distributor 23 having two rotary switches 24 and 24' and coupling condensers 25 and 25'. Choke coils 26 and 26' are inserted in the line to segregate the high frequency currents from the input side of the system. The distributor 23 is driven by a synchronous motor 28 having a suitable phase shifting device indicated by the square marked "phase shifter."

In the operation of the system the rotation of the switches 24 and 24' is so coordinated with the semi-cyclic variation of current of the supply line that for each half cycle one of the oscillators is coupled to the line end at the next half cycle the other oscillator supplies high frequency energy thereto. As stated before, the tuned circuits are selective for one frequency in one rectifier in each pair. Therefore, considering instantaneous values when the voltage in the winding 4 of the transformer 7 is positive on the anode 12 of the rectifier 1 and similarly in windings 5 and 6 on the anodes 13 and 14 of the rectifiers 2 and 3 with respect to the cathodes thereof, the oscillator supplying a frequency to which the make-alive electrodes 16, 17 and 18 of the rectifier tubes stated are resonant will be the one connected to the line by the rotary switches 24 or 24'. On the other hand at the next half cycle when the second rectifier 1', 2' and 3' in each group receives a positive potential from the respective windings of the transformer 7, the second oscillator will be connected to the line in a similar manner and the tuned circuits associated with the make-alive electrodes 16', 17' and 18' will be excited to a current conductive state. Following the circuit with respect to current flow on the direct current output side of the system let us assume that oscillator I which, as seen from the drawing, is just connected to the line when the conductive segment of the rotary switch 24 is in contact with the brush 27 supplies control energy and that the tuned circuits 19 and 20 are responsive to the frequency of the oscillator. By suitable adjustment of the phase shifter of the synchronous motor 28, the position of the distributor 23 may be so coordinated that the instant the anodes of rectifiers 1, 2 and 3 are positive with respect to their cathodes the high frequency current flowing in the tuned circuits creates a cathode spot and the rectifiers enumerated above reach a current conductive state. The current flow may be traced from the negative output terminal, through one-half of the secondary winding 4, the space path of rectifier 1, to the cathode 9, then over conductor 29 to one-half of the secondary winding 5, the space path of the rectifier 2, the cathode 10, then over conductor 29', through one-half of the winding 6, the space path of the rectifier 3 to the cathode 11 wherefrom it reaches the positive terminal of the output circuit. For the next half cycle the operation is transferred to the remaining half of each secondary winding 4, 5 and 6, the second rectifier of each group being energized. At this time, the rotary switch 24' connects oscillator II to the line, the brush 27', contacting the conductive segment of the rotary switch 24'.

The high frequency control circuit shown here is by way of example and other control systems employing for instance vacuum tubes for the alternate energization of the line may be employed without departing from the scope of this invention.

Referring to Fig. 2, the converter assembly is shown comprising a housing 31, of the type generally employed for transformers. Within the housing 31 are placed all the integral parts of the assembly, such as the power transformer 7, and the ignitron rectifiers in close proximity of the windings of the transformer. In partial cross section is shown the primary winding 8 and the secondary windings 4 and 5. Ignitron rectifiers 1, 1' and 2 are suitably supported near the particular windings to which connections are brought out to the rectifiers. The control elements including the capacitors 19 and inductances 20 forming one of the tuned circuits, and the other tuned circuits comprising capacitors 21 and inductances 22 are provided with suitable insulating covering 30 and 30' and are mounted adjacent to the rectifiers. The input and output circuits for the converter are brought out by a pair of insulating bushings 32, 32' and 33 and 33', respectively. The components of the converter within the housing are immersed in an insulating liquid, such as oil 34, with which the housing is filled to a required level.

By virtue of the high frequency control system a compact converter structure is obtained which under a single housing permits the assembly of all component parts in close physical relationship with a minimum of losses and simplicity of operation.

I claim as my invention:

1. In a system of current conversion, a bank of rectifiers of the ignitron type, having anode, cathode and make-alive electrodes, said rectifiers being arranged in series additive relation of unilateral conductivity between output terminals, divided input circuits for pairs of rectifiers in said bank, said input circuits being excited by a common source of voltage derived from an alternating current power line, means for superimposing upon said excitation voltage high-frequency impulses, selective means responsive to a particular frequency associated with the make-alive electrode of each of said rectifiers, for initiating upon response a current conductive condition in said make-alive electrodes.

2. In a system of current conversion, a plurality of rectifiers of the ignitron type each having anode, cathode and make-alive electrodes, said rectifiers being arranged in series additive relation of unilateral conductivity between output terminals, a divided input circuit for pairs of rectifiers comprising secondary windings of a power transformer, a primary winding for said transformer and an alternating current power line for the energization thereof, means for superimposing upon said line high frequency impulses alternating in frequency semi-cyclically with the frequency of said alternating current power line, and means for conductively interconnecting the anode and the make-alive electrode of each of said rectifiers, said means including a resonant circuit tuned to one of the frequencies superimposed.

3. In a system of current conversion, a plurality of rectifiers of the ignitron type each having anode, cathode and make-alive electrodes, said rectifiers being arranged in series additive relation of unilateral conductivity between output terminals, a divided input circuit for pairs of rectifiers comprising secondary windings of a power transformer, a primary winding for said transformer and an alternating current power line for the energization thereof, means for superimposing upon said line high frequency impulses alternating in frequency semi-cyclically with the frequency of said alternating current power line, and means for conductively interconnecting the anode and the make-alive electrode of each of said rectifiers, said connection including a resonant circuit comprising inductance and capacity in series tuned to one of the frequencies superimposed.

4. In a system of current conversion, a plurality of ignitron rectifiers serially connected in voltage additive relation between output terminals, an input circuit for said rectifiers comprising secondary windings of a power transformer the primary winding thereof being connected to an alternating current power line, a circuit for controlling the actuation of said rectifiers in predetermined sequence, comprising a pair of oscillation generators supplying high frequency currents of fixed frequencies, means for superimposing said frequencies upon said power line in alternating order with semi-cyclic variation of current in said line.

5. In a converter for alternating currents, a primary alternating current circuit including a power line and the primary winding of a transformer, a secondary circuit including a plurality of secondary windings of said transformer and a pair of ignitron rectifiers connected to each of said windings, said pairs of rectifiers being connected in series between output terminals supplying direct current, means for controlling simultaneously the energization of one rectifier in each of said pairs by means of high-frequency currents of one frequency in said primary circuit and for controlling simultaneously the energization the other rectifier in each of said pairs by means of high frequency currents of another frequency in said primary circuit, said control being effected in accordance with sinusoidal variation of current in said secondary circuit.

6. In a converter for alternating currents, a primary circuit including a supply line and the primary winding of a transformer, a secondary circuit including a plurality of secondary windings, units comprising a pair of ignitron rectifiers in full wave rectification arrangement for currents supplied by each of said secondary windings, a conductive connection between said units interconnecting paralleled output electrodes of said rectifiers with the input electrodes of succeeding rectifiers whereby the output of each of said units is additively combined between output terminals, means for controlling simultaneously said units comprising a high frequency circuit including sources of high frequency energy selectably deferring in frequency, a distributor and coupling impedances for alternately impressing said high frequencies upon said primary circuit and frequency responsive means associated with the control electrodes of said rectifiers.

7. In a system of current conversion, a housing containing a transformer, a bank of rectifiers of the ignitron type arranged in close proximity of said transformer and within said housing, said transformer and said rectifiers being electrically so interconnected as to form a unit whereby electrical energy in the form of alternating current of a certain voltage may be converted into direct current at different voltage, and control means associated with each rectifier in said bank responsive to high frequency impulses.

8. In a system of current conversion, a housing containing a transformer, a bank of rectifiers of the ignitron type arranged in close proximity of said transformer and within said housing, said transformer and said rectifiers being electrically so interconnected as to form an assembly whereby electrical energy in the form of direct current of a certain voltage may be converted into alternating current at another voltage, and control means associated with each rectifier in said bank responsive to high frequency impulses.

9. A current converter comprising a transformer structure having a core and a plurality of windings, apparatus comprising metal-tank rectifiers supported in close proximity of said windings and interconnected therewith by electrical conductors, electrical connections between certain electrodes of said rectifiers, certain of said connections including inductance and capacity in series relationship forming resonant circuits, a metal housing incorporating said transformer and said apparatus and an insulating liquid within said housing at a level substantially covering said transformer and said apparatus.

10. In a system of electrical current conversion, a plurality of ignitron rectifiers energized from an alternating current power line circuit, each of said rectifiers including make-alive electrodes for initiating unilateral conductivity, means for controlling the operative action of said electrodes at cyclic variation of said alternating current comprising means for superimposing a high-frequency current upon said line and frequency responsive means for causing said current to conductively energize said electrodes.

11. In a system of electrical current conversion, a plurality of ignitron rectifiers energized from an alternating-current power line circuit, each of said rectifiers including make-alive electrodes for initiating conductivity, means for controlling the operative action of said electrodes at cyclic variation of said alternating current in predetermined sequence between said rectifiers comprising means for superimposing two distinct trains of high-frequency currents varying in frequency upon said power line alternately at half cyclic variation of power line current, and frequency responsive means associated with said electrodes causing said high frequency current of one frequency to conductively energize certain of said electrodes and conductively energize other of said electrodes at said other frequency.

JOSEPH SLEPIAN.